(12) United States Patent
Elliott et al.

(10) Patent No.: US 7,285,735 B1
(45) Date of Patent: Oct. 23, 2007

(54) METHOD OF MEASURING THE WEIGHT OF BULK LIQUID MATERIAL WITHIN A TRAILER

(75) Inventors: Kenny Jay Elliott, E. Canton, OH (US); William Edward Eberhardt, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 15 days.

(21) Appl. No.: 11/507,487

(22) Filed: Aug. 22, 2006

(51) Int. Cl.
G01G 9/00 (2006.01)
G01G 23/01 (2006.01)
G01G 19/08 (2006.01)

(52) U.S. Cl. .................. 177/1; 177/137; 701/102; 702/174

(58) Field of Classification Search ............ 177/1, 177/136–138; 702/173–174; 701/101–102
See application file for complete search history.

(56) References Cited

U.S. PATENT DOCUMENTS

| | | | |
|---|---|---|---|
| 4,651,838 A * | 3/1987 | Hamilton et al. ........... 177/209 |
| 4,832,141 A | 5/1989 | Perini et al. ................. 177/141 |
| 4,854,407 A * | 8/1989 | Wagner ....................... 177/141 |
| 5,610,372 A * | 3/1997 | Phillips et al. ........... 177/25.14 |
| 5,929,388 A * | 7/1999 | Uehara et al. .............. 177/136 |
| 6,025,563 A | 2/2000 | Lesesky et al. ............. 177/136 |
| 6,408,900 B1 * | 6/2002 | Burian et al. ............... 141/286 |
| 6,457,921 B1 | 10/2002 | Freeman ...................... 410/119 |
| 6,915,884 B1 * | 7/2005 | Glazier ........................ 188/195 |

* cited by examiner

Primary Examiner—Randy W Gibson
(74) Attorney, Agent, or Firm—David M. Rosenblum

(57) ABSTRACT

Method of measuring the weight of bulk liquid material within a container of a tractor-trailer combination in which air bag pressure of a pneumatic suspension system is sensed and correlated with the weight of the bulk liquid material within the container. In accordance with the method, the tractor engine is turned off and supplemental pressurized air is introduced into a pneumatic circuit feeding compressed air to the air bags and while not applying the brakes of the trailer.

7 Claims, 1 Drawing Sheet

METHOD OF MEASURING THE WEIGHT OF BULK LIQUID MATERIAL WITHIN A TRAILER

FIELD OF THE INVENTION

The present invention relates to a method of measuring the weight of a bulk liquid material within a trailer of a tractor-trailer in which air pressure within air bags of a pneumatic suspension system is measured and correlated with the weight of bulk liquid material located within the trailer.

BACKGROUND OF THE INVENTION

Bulk liquid material is transported by tractor-trailer combinations in which the bulk liquid material is loaded into a container of the trailer. For example, the container can be a tank built into the trailer that is filled with a liquid bulk liquid material. Special precautions must be taken when loading liquid bulk liquid materials that are hazardous materials and substances such as flammable liquids, corrosives, or a cryogenic substance such as liquid oxygen, liquid nitrogen or other liquefied gases.

In trailers that have an air ride suspension, the tank or other container of the trailer is supported by a pneumatic air suspension system having air bags to support the container on the axles of the trailer. The air bags are supplied with compressed air that is generated by a compressor powered by an internal combustion engine of the tractor, typically a diesel engine. The pneumatic suspension system has a pneumatic circuit which supplies the air from the compressor to the air bags. Among other known features of such a pneumatic circuit are self-leveling valves that are provided for each set of the air bags to ensure that the container is maintained at a level attitude and at a predetermined ride-height. In this regard, in a trailer having two axles, there would be four air bags, two over each axle and on either side of the trailer chassis.

It is safety critical that the weight of bulk hazardous materials being loaded into the trailer does not exceed a predetermined weight that would overload the trailer. Scales, while being the most accurate way to load bulk liquid materials into trailers, are expensive devices to acquire and maintain and in any case, are not always available during loading operations. Thus, loading trailers to a desired weight, on a consistent basis, when a scale is not available is an on-going challenge. When product is inconsistently loaded into the trailer, distribution inefficiencies can arise that will equate to a revenue loss, product waste and related costs attached to under or over-loading trailers during the filling process.

It has long been known that the weight of a trailer can be equated to the pressure within air bags of a pneumatic suspension system. For example, in U.S. Pat. No. 4,832,141, pressure is measured within an air bag of a pneumatic suspension system via a transducer that is connected to a read-out device located in the vehicle to display the weight of the load. Similarly, U.S. Pat. No. 6,025,563 discloses an apparatus that utilizes pressure within an air bag to determine the load weight of the trailer in which a calibration signal represented of predetermined load weight limit levels stored within a digital memory and utilized for comparison basis to compare the calibration signal pressure signals preferable to air bag pressure. Indicators are then used to indicate when the load weight is either below or above predetermined load weight limit levels.

The problem with such methods is that they depend upon the tractor engine operating to power the compressor to supply compressed air to the pneumatic suspension system. This of course presents a safety hazard when substances such as gasoline or liquid oxygen are to be carried. However, if the ignition is turned off and the compressor therefore shuts down, as the container of the trailer is loaded with the bulk liquid material, the air stored within a reservoir of the pneumatic system will deplete, resulting in a delay in the air bag lifting process and inaccurate readings and a potentially shifting of the bulk liquid material within the container to prevent maintenance of the container in a level attitude when loading or even afterwards, when the tractor engine is restarted.

In order to overcome these problems, the present invention provides a process for measuring the weight of the container during its filling with the bulk liquid material that allows the tractor engine to be shut down.

SUMMARY OF THE INVENTION

The present invention provides a method of measuring the weight of bulk liquid material within a container of a trailer of a tractor-trailer. The container is supported by pneumatic suspension system of the trailer that is supplied with compressed air by a compressor powered by an internal combustion engine of the tractor. In accordance with the method, the internal combustion engine is turned off so that the compressed air is not being replenished to the pneumatic suspension from the tractor. Also the trailer brakes of the trailer are released to allow the trailer to freely flex. Supplemental pressurized air is introduced into a pneumatic circuit of the pneumatic suspension system at a pressure above a required pressure to support the container at a ride-height after having been filled with a predetermined load of the bulk liquid material. Air bag pressure of air bags is measured within the pneumatic suspension system. The air bags are connected to the pneumatic circuit to receive the supplemental pressurized air. The air bag pressure is then correlated with the weight of the bulk liquid material located within the container. The weight measurement can be used during filling operations. In such case, weight measurements are taken during the loading of the container to make certain either a predetermined amount of bulk liquid material is loaded into the container or to make certain that the trailer is not over-loaded with the bulk liquid material. Alternatively, the weight measurements can be taken during off-loading operations to dispense a required amount of bulk-material to a customer. For example, the weight can be noted before the off-loading or delivery operation and when a predetermined weight is reached, the off-loading or delivery can be terminated.

The supplemental pressurized air can be introduced into the pneumatic circuit from a compressed air source that is external to the tractor-trailer. Alternatively, a compressed air storage tank can be filled with the supplemental pressurized air. The compressed air storage tank can be situated on the trailer and connected to the pneumatic circuit. In such case, the supplemental pressurized air is supplied to the pneumatic circuit from the compressed air storage tank.

The air bag pressure is preferably measured by a pressure transducer in communication with one of the air bags and the pressure transducer generates an electrical signal referable to the air bag pressure. The container can be a trailer tank to contain the bulk liquid material as a liquid. The present invention has particular applicability to the transport of liquids, for example, a liquefied atmospheric gas, that can be liquid oxygen.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
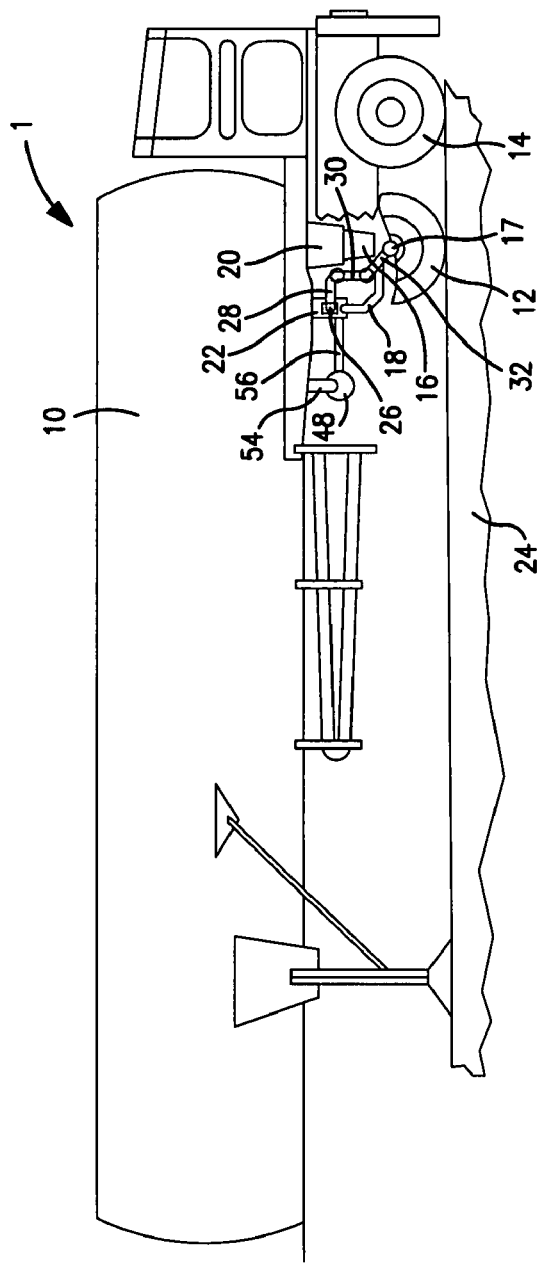
FIG. 1 is an elevational-view of a trailer modified in accordance with the present invention.

With reference to FIG. 1, a trailer 1 is illustrated that contains a tank 10 that is designed to hold a liquefied atmospheric gas such as liquid oxygen. It is understood that this is for exemplary purposes only and the present invention has application for other bulk liquid materials to be transported such as gasoline, fuel oil as well as other liquefied atmospheric gases such as argon, nitrogen and etc.

Trailer 1 is designed to be connected to a tractor, not illustrated. The container 10 of trailer 1 is supported by an air suspension system that is well known in the art. The air suspension system supports container 10 from axles 17 attached to wheels 12 and 14. The air suspension system includes four air bags 16, each positioned over axles 17 and on either side of the chassis (shown in FIG. 2), between a trailing arm 18 and a frame 20 of the trailer 1. Trailing arm 18 is attached to a hangar 22 in a manner that allows trailing arm 18 to pivot as wheels 12 and 14 pass over obstructions within a roadway 24. Through inflation of the air bags 16, the container 10 is maintained at a ride height above the axles 17 when container 10 is filled with a predetermined load of the bulk liquid material. In this regard, the ride height is the height at which the pneumatic suspension system is designed to support the container 10 and related chassis over the axles 17.

Figure 2:
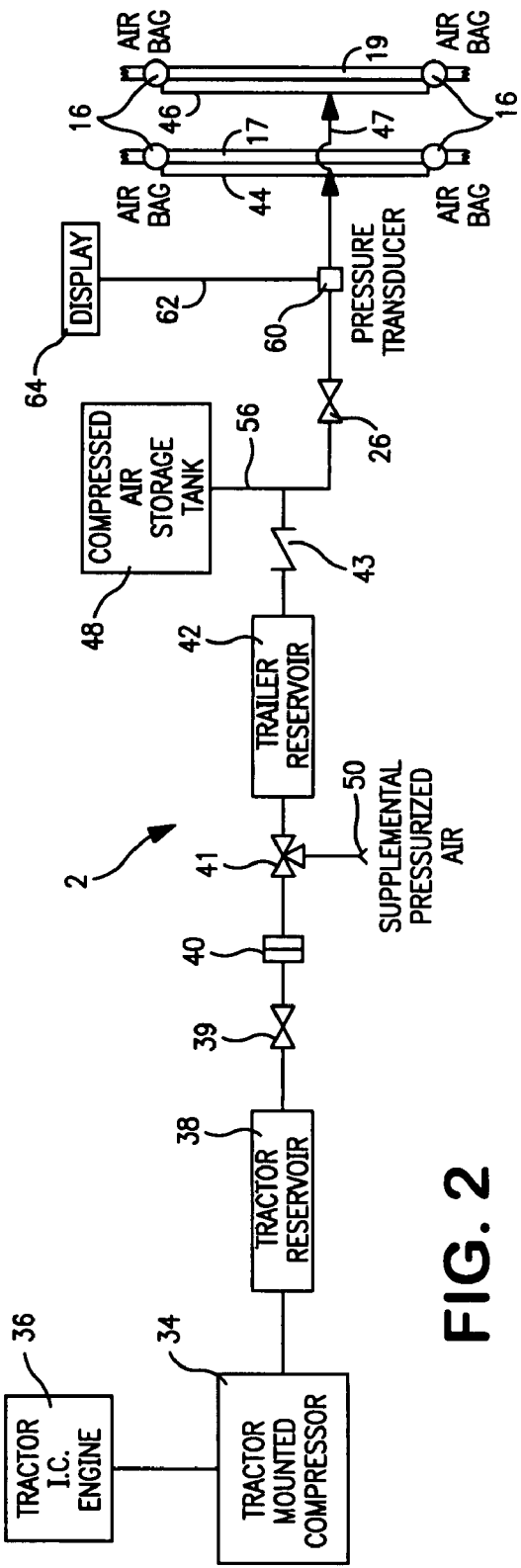
FIG. 2 is a schematic illustration of a pneumatic circuit and air bags utilized within trailer illustrated in FIG. 1.

Air bags 16 are filled with compressed air that is routed to air bags 16 by a pneumatic circuit 2, illustrated in FIG. 2, that includes a leveling valve 26, a three-way valve, generally discussed above. As indicated above, the leveling valve 26 ensures that container 10 is supported above the axles 17 at the ride height. The leveling valve 26 is activated by a valve actuator arm 28 that is positioned by a tie-rod 30 connected to axle 17 by a bracket 32.

As container 10 is loaded with a liquid, actuating arm 28 will tend to move upwardly causing compressed air to enter air bag 16. This is due to downward motion of trailer 1 induced by increased weight of the contents of container 10. The increase in air pressure will act to lift the container 10 to and thus, maintain container 10 at, the ride-height.

With reference to FIG. 2, as indicated above, compressed air is supplied to a pneumatic circuit 2 of the pneumatic suspension system by means of a tractor mounted compressor 34 that is powered by the internal combustion engine 36 of the tractor. It is to be noted here that the pneumatic circuit 2 has been simplified to indicate the parts of the pneumatic circuit that exist in tractor-trailer combinations that are relevant to a discussion of the present invention. For example, the braking circuit is not illustrated. Additionally, it is also understood that such circuits will differ based upon the particular manufacturer and customer requirements. In pneumatic circuit 2, compressed air continually charges a tractor reservoir 38 mounted in the tractor and then flows through a manual trailer brake air supply dump valve 39 to be introduced into pneumatic circuit 2 of the trailer 1 through a removable coupling 40. Compressed air then flows to an anti tow-away three-valve valve 41 to charge a trailer reservoir 42 mounted in the trailer 2. The air, after passage through a check valve 43, flows through the leveling valve 26 and then, depending upon the height of container 10 over the axles, to air bags 16 through pneumatic lines 44, 46 and 47. As the container 10 fills with liquid, the downward motion of the container 10 will cause the leveling valve 26 to open to introduce compressed air into all of the air bags 16 through pneumatic lines 44, 46 and 47.

In accordance with the present invention, supplemental pressurized air can be introduced into a quick-connect fitting and line 50 provided to the air dump section of anti towaway three-way valve 41. During filling operations, the manual trailer brake air supply dump valve 39 is set to dump air from the pneumatic circuit 2 within trailer 2 and thus set the trailer brakes. This acts to also isolate the pneumatic circuit of the tractor from the trailer. The tractor internal combustion 36 is turned off. The anti tow-away three-way valve 41 is set by opening the trailer doors at the back of the trailer 2 from which the trailer is filled with the liquid and acts to dump pressurized air from downstream of such valve. This sets the trailer brakes with the purpose of preventing the trailer 2 from being moved with the doors open. The supplemental pressurized air is supplied to pneumatic circuit 2 through quick-connect fitting 50. This acts to release the brakes of trailer 2 and to supply pressure to leveling valve 26 for purposes of pressurizing the air bags. The supply pressure of the supplemental pressurized air should be greater than the pressure that is required to maintain container 10 at the ride-height. This greater pressure will help to prevent a lag in pressure measurements. The maximum pressure used should be a pressure that would not, however, cause damage to pneumatic system 2. Such pressure can be the delivery pressure of the tractor mounted compressor 34, for example, 130 psi. The pressure can be less than the delivery pressure of the tractor mounted compressor 34 if less than a full load were to be transported. It is to be noted that as the container 10, fills, it and trailer 1 will tend to flex. If the brakes were left in a set position, such flexing will be inhibited to cause the lifting process to bind and thereby to artificially increase pressure within the air bags 16. This will result in an erroneous weight measurement.

Supplemental pressurized air can alternatively be supplied from a compressed air storage tank 48 that is charged with the supplemental pressurized air prior to introducing the bulk liquid material liquid into container 10 by the tractor mounted compressor 38. Check valve 43 prevents back-flow of compressed air from the compressed air storage tank 48 back to trailer reservoir 42. As illustrated in FIG. 1, compressed air storage tank 48 is connected to the chassis of trailer 1 via brackets 54. A pneumatic line 56, allows compressed air to flow from compressed air storage tank 48 to the pneumatic circuit 2. Thus, in situations where shop air does not exist, the supplemental compressed air can be supplied through pneumatic line 56. It should be mentioned that compressed air storage tank 48 can be used alone without the need for any external air supply and as such, when compressed air storage tank 48 is used there would be no provision for quick connect fitting 50 and its associated line to the anti tow-away three way valve 41. The volume of compressed air storage tank 48 can be calculated for a particular installation or determined experimentally. However, since it is charged with pressurized air originally supplied from the tractor compressor 34, such pressure will be above that required to maintain the container 10 at the ride height when loaded. It is to be noted that when compressed air storage tank 48 is used, the manual trailer brake air supply dump valve 39 would not be set. When the trailer doors are opened for a filling operation, the brakes in trailer 2 would be set. In order to override this feature, the anti tow-away valve 40 is manually manipulated to reset it into a position in which air can be supplied to the trailer braking system from residual air in trailer reservoir 42 to release the brakes.

The air bag pressure within the air bags 16 is measured by a pressure transducer 60 that generates an analog signal referable to the pressure being measured. The analog signal is transmitted by an electrical connection 62 to a display 64 that can either display the pressure or can display the weight of container 10 directly. If only pressure is displayed, a conversion table would have to be provided in order to convert the pressure reading to the weight. It is to be noted that weight measurements will be accurate so long as trailer 1 is in a level attitude. This may not always be the case given the fact that certain loading sites will not be level. In such case, experimentally determined correction factors can be incorporated into the conversion table or otherwise to correct the weight determined by measurements taken from display 64. Such correction factors would be specific for each site at which container 10 is to be loaded or unloaded.

In many installations, the actual equipment that is used to fill container 10 incorporates programmable logic control and the signal generated by pressure transducer 60 could act as an input into such control system to allow for monitoring and termination of the fill process. As indicated above, the present method can be used in reverse, namely to offload a desired amount of bulk-content from container 10. In such case the weight would be measured before and during the supply of bulk liquid to a customer so that a predetermined amount of bulk-material were supplied to a customer.

As will be appreciated to those skilled in the art, while the invention has been described with reference to a preferred embodiment, numerous changes and omissions can be made without departing from the spirit and scope of the present invention as set forth in the appended claims.

We claim:

1. A method of measuring the weight of bulk liquid material within a container of a trailer of a tractor-trailer, the container being supported by a pneumatic suspension system of the trailer supplied with compressed air by a compressor powered by an internal combustion engine of the tractor, said method comprising:

turning off the internal combustion engine so that the compressed air is not being replenished to the pneumatic suspension system from the tractor;

releasing trailer brakes of the trailer to allow the trailer to freely flex;

introducing supplemental pressurized air into a pneumatic circuit of the pneumatic suspension system at a pressure above a required pressure to support the container at a ride-height after having been filled with a predetermined load of the bulk liquid material;

measuring air bag pressure of air bags within the pneumatic suspension system, the air bags being connected to the pneumatic circuit to receive the supplemental pressurized air; and correlating the air bag pressure with the weight of the bulk liquid material located within the container.

2. The method of claim 1, wherein the supplemental pressurized air is introduced into the pneumatic circuit from a compressed air source that is external to the tractor-trailer.

3. The method of claim 1, further comprising:

filling a compressed air storage tank with the supplemental pressurized air, the compressed air storage tank being situated on the trailer and connected to the pneumatic circuit; and supplying the supplemental pressurized air to the pneumatic circuit from the compressed air storage tank.

4. The method of claim 2 or claim 3, wherein the air bag pressure is measured by a pressure transducer in communication with one of the air bags and the pressure transducer generates an electrical signal referable to the air bag pressure.

5. The method of claim 4, wherein the container is a trailer tank to transport the bulk liquid material.

6. The method of claim 5, wherein the liquid is a liquefied atmospheric gas.

7. The method of claim 6, wherein the liquefied atmospheric gas is liquid oxygen.

* * * * *